(12) United States Patent
Saitoh

(10) Patent No.: US 6,185,296 B1
(45) Date of Patent: Feb. 6, 2001

(54) RING TRIP CIRCUIT FOR STOPPING CALL SIGNAL AT DIFFERENT TIMING FROM ZERO-CROSSING POINT OF CALL SIGNAL

(75) Inventor: Masashi Saitoh, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/979,770

(22) Filed: Nov. 26, 1997

(30) Foreign Application Priority Data

Nov. 26, 1996 (JP) .................................................. 8-315110

(51) Int. Cl.[7] .................................................. H04M 1/00
(52) U.S. Cl. ........................................ 379/382; 379/377
(58) Field of Search .................................. 379/382, 387, 379/373, 377, 399, 379, 413, 418

(56) References Cited

U.S. PATENT DOCUMENTS

| | | | | |
|---|---|---|---|---|
| 4,731,828 | * | 3/1988 | Basehore | 379/382 |
| 5,335,271 | * | 8/1994 | Takato et al. | 379/382 |
| 5,402,482 | * | 3/1995 | Minohara et al. | 379/377 |
| 5,600,715 | * | 2/1997 | Bingel | 379/393 |
| 5,636,273 | * | 6/1997 | Schopfer et al. | 379/377 |
| 5,640,451 | * | 6/1997 | Schopfer | 379/377 |
| 5,659,608 | * | 8/1997 | Stiefel | 379/377 |
| 5,671,272 | * | 9/1997 | Cotreau | 379/405 |
| 5,675,640 | * | 10/1997 | Tappert et al. | 379/377 |
| 5,694,465 | * | 12/1997 | Apfel | 379/382 |
| 5,706,342 | * | 1/1998 | Baeder et al. | 379/377 |
| 5,712,910 | * | 1/1998 | Saito | 379/377 |

FOREIGN PATENT DOCUMENTS

| | | |
|---|---|---|
| 57-30456 | 2/1982 | (JP) . |
| 58-6650 | 1/1983 | (JP) . |
| 63-52553 | 3/1988 | (JP) . |
| 63-221751 | 9/1988 | (JP) . |
| 2-222349 | 9/1990 | (JP) . |
| 4-135352 | 5/1992 | (JP) . |
| 5-219197 | 8/1993 | (JP) . |
| 6-178972 | 6/1994 | (JP) . |
| 6-188972 | 7/1994 | (JP) . |

* cited by examiner

Primary Examiner—Wing F. Chan
(74) Attorney, Agent, or Firm—Scully, Scott, Murphy & Presser

(57) ABSTRACT

A ring trip circuit is incorporated in a telephone exchanger together with a call signal source and a relay unit connected between the call signal source and user's terminal, and determines current status of the user's terminal at a certain timing close to the zero level of a call signal changed across the zero level without influence of fluctuation of the call signal source, a loop resistance and a leak resistance, thereby preventing the user's terminal from undesirable interruption of the call signal.

18 Claims, 6 Drawing Sheets

RING TRIP CIRCUIT FOR STOPPING CALL SIGNAL AT DIFFERENT TIMING FROM ZERO-CROSSING POINT OF CALL SIGNAL

FIELD OF THE INVENTION

This invention relates to a ring trip circuit and, more particularly, to a ring trip circuit incorporated in a telephone exchanger for producing a reset signal at a different timing from the zero-crossing point of a call signal.

DESCRIPTION OF THE RELATED ART

The ring trip circuit is incorporated in a telephone exchanger for controlling a call signal. When the telephone exchanger selects a telephone subscriber, the telephone exchanger supplies the call signal to the telephone subscriber. If the telephone subscriber responds to the call signal, the ring trip circuit stops the call signal. A typical example of the ring trip circuit is disclosed in Japanese Patent Publication of Unexamined Application No. 6-188972, and FIG. 1 illustrates the circuit configuration of the prior art ring trip circuit disclosed in the Japanese Patent Publication of Unexamined Application.

The prior art ring trip circuit comprises a call signal source 1 which superimposes an ac call signal VAC on a dc potential VDC so as to produce a call signal. The call signal source 1 has one end connected to a lease resistor 2, and the lease resistor 2 is used for current detection and current control. The lease resistor 2 is connected to a pair of photo-emitting diodes 3a/3b, and the photo-emitting diodes 3a and 3b are connected in parallel between the lease resistor 2 and a call signal transfer relay unit 4. The photo-emitting diodes 3a and 3b are inverted to each other, and form in combination an optical signal transmitting unit 3. The anode of the photo-emitting diode 3a and the cathode of the photo-emitting diode 3b are connected to the lease resistor 2, and the anode of the photo-emitting diode 3b and the cathode of the photo-emitting diode 3b are connected to a first relay contact r1 of the call signal transfer relay unit 4.

The call signal source 1 has the other end connected to the ground. The other end of the call signal source 1 is further connected to a current limiting resistor 5, which in turn is connected to a second relay contact r2 of the call signal transfer relay unit 4. The call signal transfer relay unit 4 selectively connects a call signal source 1 to telephone subscriber lines 6. The telephone subscriber lines 6 are connected to a terminal 7. Each of the telephone subscriber lines 6 provides a loop resistance 6a and a leak resistance 6b depending upon individual conditions such as the distance between the telephone exchanger and the terminal 7. The terminal 7 includes a bell circuit equivalent to a series combination of a condenser CB, a resistor RB and a coil LB and a series combination of a hook switch S and a dc end resistor RS.

The photo-emitting diodes 3a/3b of the optical signal transmitting circuit 3 supply an optical signal Sop1 to a photo-detecting transistor 8a of an optical receiver 8. The photo-detecting transistor 8a has a collector connected to a positive potential line PT and an emitter connected through a resistor 8b to the ground, and flows emitter current into the resistor 8b. The emitter current is equivalent to the current passing through the lease resistor 2. Thus, the optical receiver detects the current passing through the lease resistor 2. The resistor 8b converts the emitter current to an output potential signal Scrt, and the output potential signal Scrt is supplied to the output node of the optical receiver 8 between the photo-detecting transistor 8a and the resistor 8b.

The output potential signal Scrt is supplied to a logic circuit 9. The logic circuit 9 has a threshold equivalent to a zero-crossing value of the call signal, and compares the output potential signal Scrt with the threshold so as to give a binary value to the output potential signal. Thus, the logic circuit 9 converts the output potential signal to a binary signal Db, and the binary signal Db is supplied to a counter 10.

While the binary signal Db is in the high level, the counter 10 is enabled, and increments the value in response to a clock pulse CLK. The output signal CNT of the counter 10 is indicative of the number of clock pulses CLK, and is compared with a digital threshold value DTH. If the value of the output signal CNT is less than the digital threshold, the comparator 11 determines the terminal 7 to be in on-hook status or off-state of the hook switch S. On the other hand, if the value of ,the output signal CNT is equal to or greater than the digital threshold, the comparator 11 determines the terminal 7 to be in off-hook status or on-state of the hook switch S. Thus, the comparator 11 produces a status signal STUS representative of the status of the terminal 7, and the status signal STUS is supplied to a reset signal source 12.

The reset signal source 12 is gated with the status signal STUS, and supplies a reset signal RST to a flip flop circuit 13 for controlling the relay unit 4 at transition timings of the binary signal Db from the high level to the low level and vice versa. As described hereinbefore, the threshold of the logic circuit 9 is equivalent to the value of the call signal at the zero-crossing point. Therefore, the reset signal RST is produced at the zero-crossing timings of the call signal.

When a relay-on signal RLY is supplied to the flip flop circuit 13 as a command from an upper level, the flip flop circuit 13 is changed to set-status, and causes the relay unit 4 to change the relay contacts r1/r2 to the call signal source 1. On the other hand, the flip flop circuit 13 is changed to the reset status in response to the reset signal RST, and causes the relay unit 4 to isolate the relay contacts r1/r2 from the call signal source 1.

The resistance of the lease resistor 2, the resistance of the current limiting resistor 5, the dc potential level VDC, the ac call signal VAC, the loop resistance 6a, the leak resistance 6b, the capacitance of the capacitor CB, the resistance of the resistor RB, the inductance of the coil LB and the resistance of the resistor RS are assumed to be 1 kilo-ohm, 0.15 kilo-ohm, 48 volts, 75 Vrms at 25 Hz, zero ohm, infinity, 0.45 micro-F, 54 H, 3.65 kilo-ohm and 0.4 kilo-ohm, respectively. When the relay-on signal RLY is supplied to the flip flop circuit 13, the flip flop circuit 13 is changed to the set-status, and the call signal transfer relay unit 4 connects the call signal source 1 to a telephone subscriber line 6. Then, the call signal is supplied from the call signal source 1 through the telephone subscriber line 6 to the terminal 7.

If the terminal 7 is in the on-hook status or the hook switch S is in the off-state, the capacitor CB allows only the ac call signal to pass through the bell circuit (see FIG. 2A), and the dc potential does not pass through the capacitor CB. The current IR2 passing through the lease resistor 2 is expressed by equation 1.

$$IR2 = 13.4 \times \text{Sin}(50\pi t)[mA] \qquad \text{equation 1}$$

When the potential exceeds over 0.7 volt as a clamp voltage of the photo-emitting diode 7a, the photo-emitting diode 3a emits the light, and supplies the optical signal Soc1 to the photo-detecting transistor 8a. For this reason, the output potential signal Scrt is in the high level for 19.34 millisecond, and remains in the low level for 20.66 millisecond.

If a frame signal at 8 kliz is used as the clock pulse CLK, the count value CNT1 during the high level is given as $$CNT1=19.34[ms]/0.125[msec]=154 \quad \text{equation 2}$$

The duty ratio is 48.4 percent.

On the other hand, if the terminal is in the off-hook status, the hook switch S provides a dc current loop, and the ac call signal VAC is superimposed on the dc potential as shown in FIG. 2B. The dc potential component offsets the call signal from that under the on-hook status, and makes the current passing through the photo-emitting diodes unbalance. The current IR2 is calculated as $$IR2=68.4\times Sin\ (50\pi t)+31[mA] \quad \text{equation 3}$$

As a result, the output potential signal S is in the high level for 25.84 millisecond, and is maintained in the low level for 14.16 millisecond. The count value CNT1 during the high level is given as $$CNT1=25.84[ms]/0.125[msec]=206 \quad \text{equation 4}$$

The duty ratio is 64.6 percent.

The count value is different between the on-hook status and the off-hook status, and the digital threshold DTH is determined to be an intermediate value between 154 and 206. The comparator 11 compares the output signal CNT with the digital threshold DTH to see whether the terminal 7 is in the on-hook status or the off-hook status. The count value does not reach the digital threshold DTH in the on-hook status, and the status signal STUS remains low as shown in FIG. 2A. On the other hand, when the terminal 7 is in the off-hook status, the comparator 11 changes the status signal STUS to the high level (see FIG. 2B).

Even if the comparator 11 changes the status signal STUS to the high level, the reset signal source 12 produces the reset signal in response to a zero-crossing signal ZC. The binary signal Db is directly supplied to the reset signal source 12, and the reset signal source 12 produces the zero-crossing signal ZC at the leading edge and the trailing edge of the binary signal Db. For this reason, time delay Δt is introduced between the rising edge of the status signal STUS and the zero-crossing signal ZC as shown in FIG. 2B. The reset signal source 12 supplies the reset signal RST to the flip flop circuit in response to the zero-crossing signal ZC after the change of the status signal STUS to the high level (see FIG. 2B), and, accordingly, the flip flop circuit output signal 13 falls 13 falls the output signal.

The reason why the reset signal source 12 supplies the reset signal RST to the flip flop circuit 13 in response to the reset signal RST is that of prevention of excess voltage. In detail, if the reset signal RST is produced at a certain timing different from the zero-crossing point, the flip flop circuit 13 causes the call signal transfer relay unit 4 to change the relay contacts r1/r2 from the call signal source 1 while the call signal has either positive or negative potential level, and an excess voltage takes place. The excess voltage is causative of damage on the relay contacts r1/r2 and the power supply circuit, and malfunction takes place in associated circuits. For this reason, the reset signal source 12 supplies the reset signal RST to the flip flop circuit 13 in response to the zero-crossing signal ZC so as to prevent the associated circuits from the above described troubles.

The telephone subscriber line 6 provides the loop resistance 6a and the leak resistance 6b as described hereinbefore. The loop resistance 6a and the leak resistance 6b are not constant. In fact, the loop resistance 6a ranges from zero to 800 ohms, and the leak resistance falls the range between 15 kiloohms and infinitive. The loop resistance 6a decays the call signal, and the leak resistance 6b superimposes the ac signal on a certain dc potential under the on-hook status. Moreover, the signal source 1 may produce the call signal under different conditions. This means that there is a possibility that the count value in the on-hook status becomes larger than the count value in the off-hook status. If the count value in the on-hook status becomes larger than the digital threshold value DTH, the comparator 11 changes the status signal STUS to the high level, and the flip flop circuit 13 changes the output signal to the low level. The call signal transfer relay unit 4 isolates the telephone subscriber line 6 from the call signal source 1. This results in that the terminal 7 stops the ringing.

For example, assuming now that the prior art call signal source 1 is operative under the dc potential level VDC of 48±10 volts and the ac signal VAC of 60–120 Vrms at 14–33 Hz. If the dc potential and the ac amplitude are maximized and minimized, respectively, the count value is maximized in the on-hook status. The most undesirable conditions are resulted from the loop resistance 6a of 800 ohms, the leak resistance 6b of 15 kilo-ohms, the dc component of 58 volts and the ac signal of 60 Vrms. The frequency of the ac signal VAC does not have any influence on the count value, and is assumed to be 25 Hz. In this situation, the current IR2 is given as $$IR2=12.2\times Sin\ (5090\ t)+3.46[mA] \quad \text{equation 5}$$

The output potential signal Scrt is in the high level for 22.98 millisecond, and is in the low level for 17.02 millisecond. For this reason, the count value under the on-hook status is calculated as $$CNT1=22.98/0.125=183 \quad \text{equation 6}$$

The duty ratio is 57.5 percent.

On the other hand, the count value is maximized in the off-hook status under the maximum dc potential component and the maximum ac amplitude. The loop resistance 6a is 800 ohms, the leak resistance 6b is infinity, the dc potential component VDC is 38 volts, and the ac signal VAC is 120 Vrms at 25 Hz. The current IR2 is given by equation 7.

$$IR2=60.0\times Sin\ (50\pi t)+11.45[mA] \quad \text{equation 7}$$

The output potential signal Scrt is in the high level for 22.70 millisecond, and is in the low level for 17.30 millisecond. The count value CNT1 is calculated as follows.

$$CNT1=22.70/0.125=181 \quad \text{equation 8}$$

The duty ratio is 56.8 percent. Thus, the count value CNT1 in the on-hook status becomes larger than the count value CNT1 in the off-hook status, and the terminal 7 undesirably stops the ringing.

Another problem is unavoidable time delay inherent in the call signal transfer relay unit 4. When the output signal of the flip flop circuit 13 is changed to the low level, the call signal transfer relay unit 4 completes the change of relay contacts r1/r2 after 1 to 3 millisecond. Even if the reset signal source 12 produces the reset signal RST in synchronism with the zero-crossing signal ZC, the call signal transfer relay unit 4 changes the relay contacts r1/r2 after the zero-crossing point, and the time delay is causative of the excess voltage.

SUMMARY OF THE INVENTION

It is therefore an important object of the present invention to provide a ring trip circuit, which is free from the undesirable interruption of a call signal and the excess voltage.

In accordance with one aspect of the present invention, there is provided a ring trip circuit associated with a call signal source electrically connected through a relay unit and a selected subscriber line to user's terminal for supplying a call signal changed across zero level, and the ring trip circuit comprises a photo-emitting unit connected to a signal line assigned to the call signal, and producing an optical signal representative of the magnitude of the call signal, a photo-detecting unit optically connected to the photo-emitting unit, and producing a first electric signal changed from a first potential level to a second potential level and vice versa when the call signal is decreased to a certain magnitude close to the zero level, a status discriminator connected to the photo-detecting unit discriminating status of the user's terminal at the change of the first electric signal changed from the first potential level to the second potential level, and producing a second electric signal representative of the status of the user's terminal and a relay controller connected to the status discriminator and a command source for controlling the relay unit, and supplying a third electric signal to the relay unit depending upon the status for changing the relay unit.

BRIEF DESCRIPTION OF THE DRAWINGS

The features and advantages of the ring trip circuit will be more clearly understood from the following description taken in conjunction with the accompanying drawings in which.

DESCRIPTION OF THE PREFERRED EMBODIMENT

Figure 1:
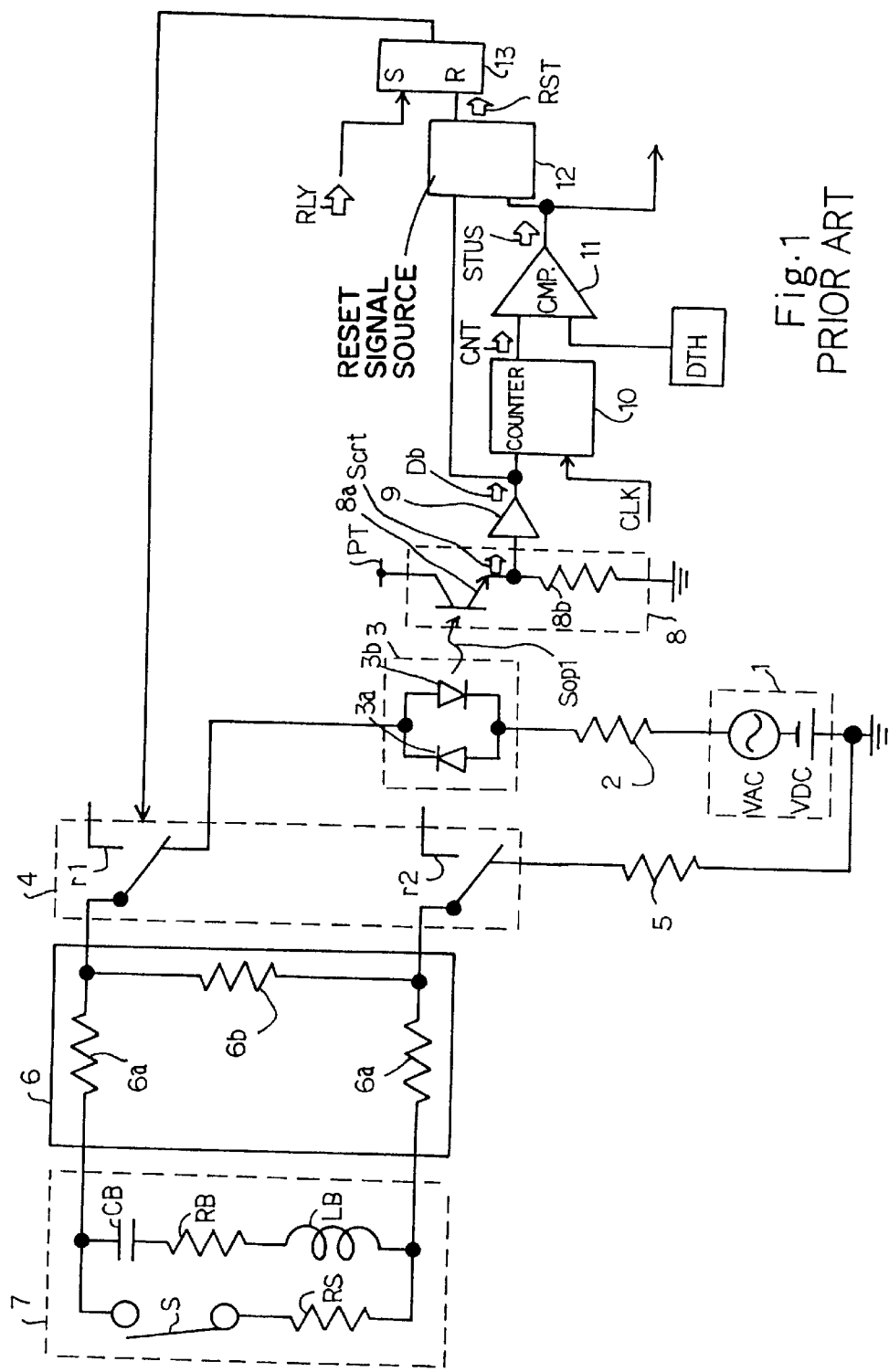
FIG. 1 is a circuit diagram showing the prior art ring trip circuit incorporated in the telephone exchanger.
Figure 2A:
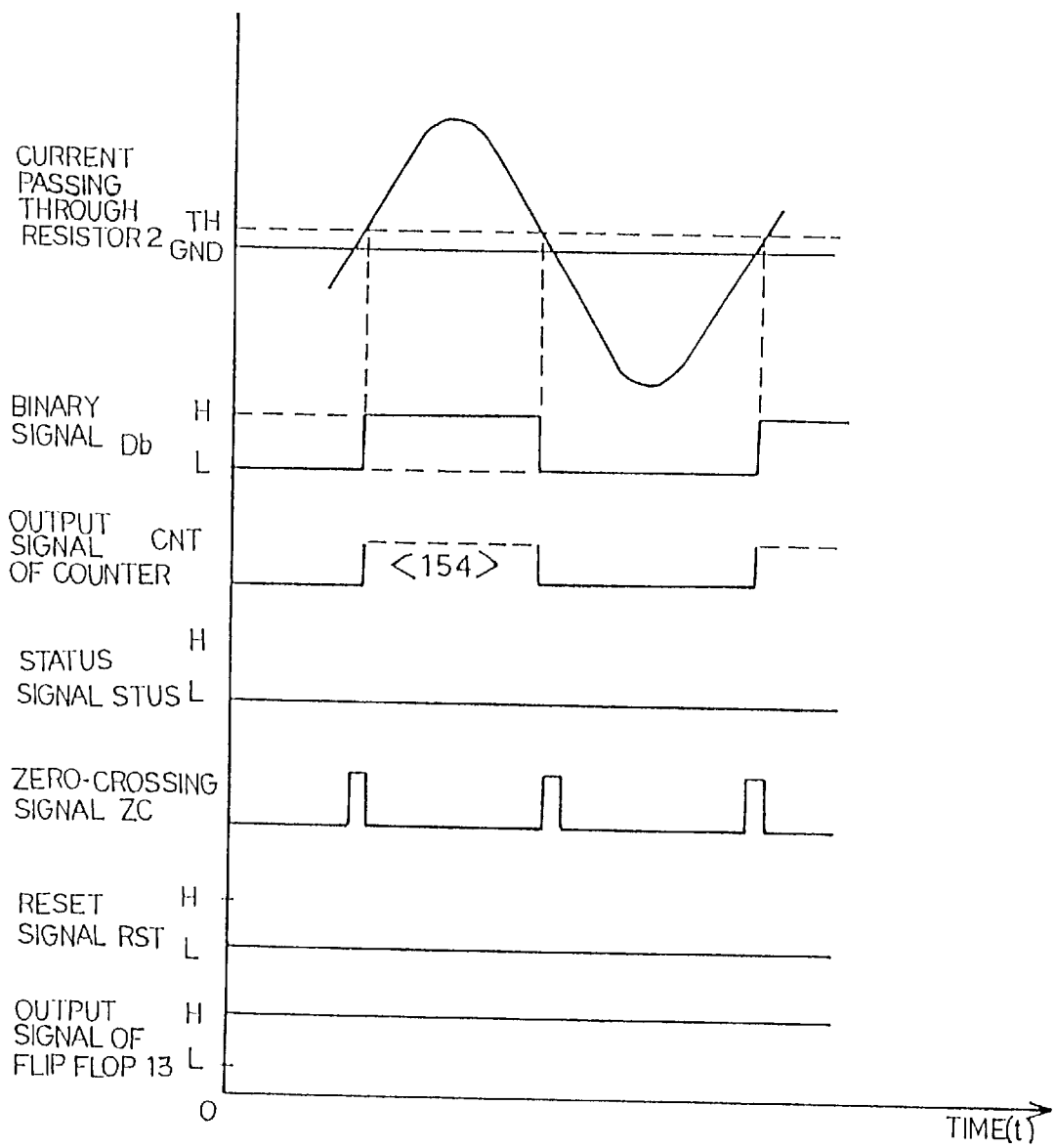
FIG. 2A is a view showing the waveforms of the essential signals produced in the prior art ring trip circuit in the on-hook status.
Figure 2B:
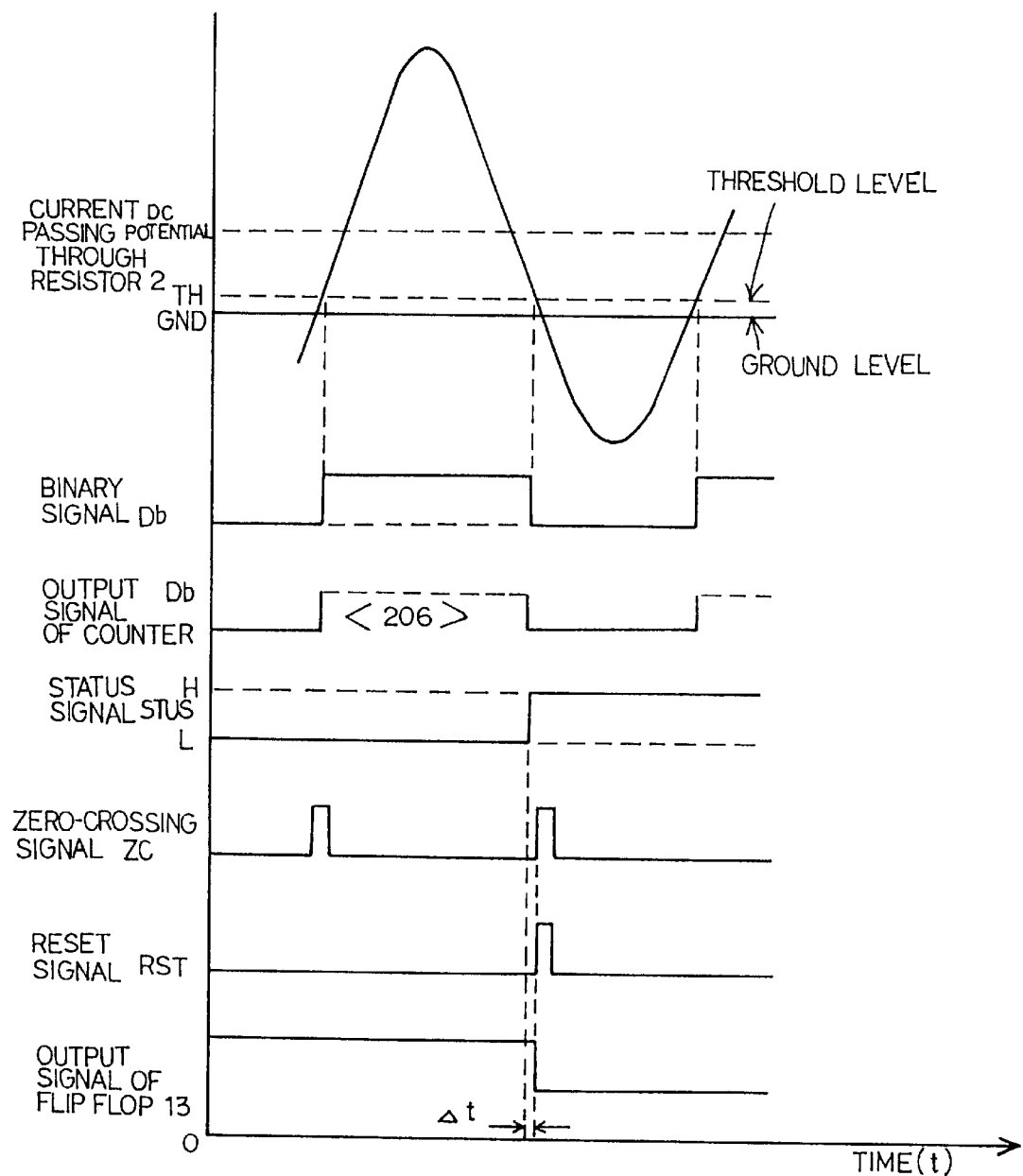
FIG. 2B is a view showing the waveforms of the essential signals produced in the prior art ring trip circuit in the off-hook status.
Figure 3:
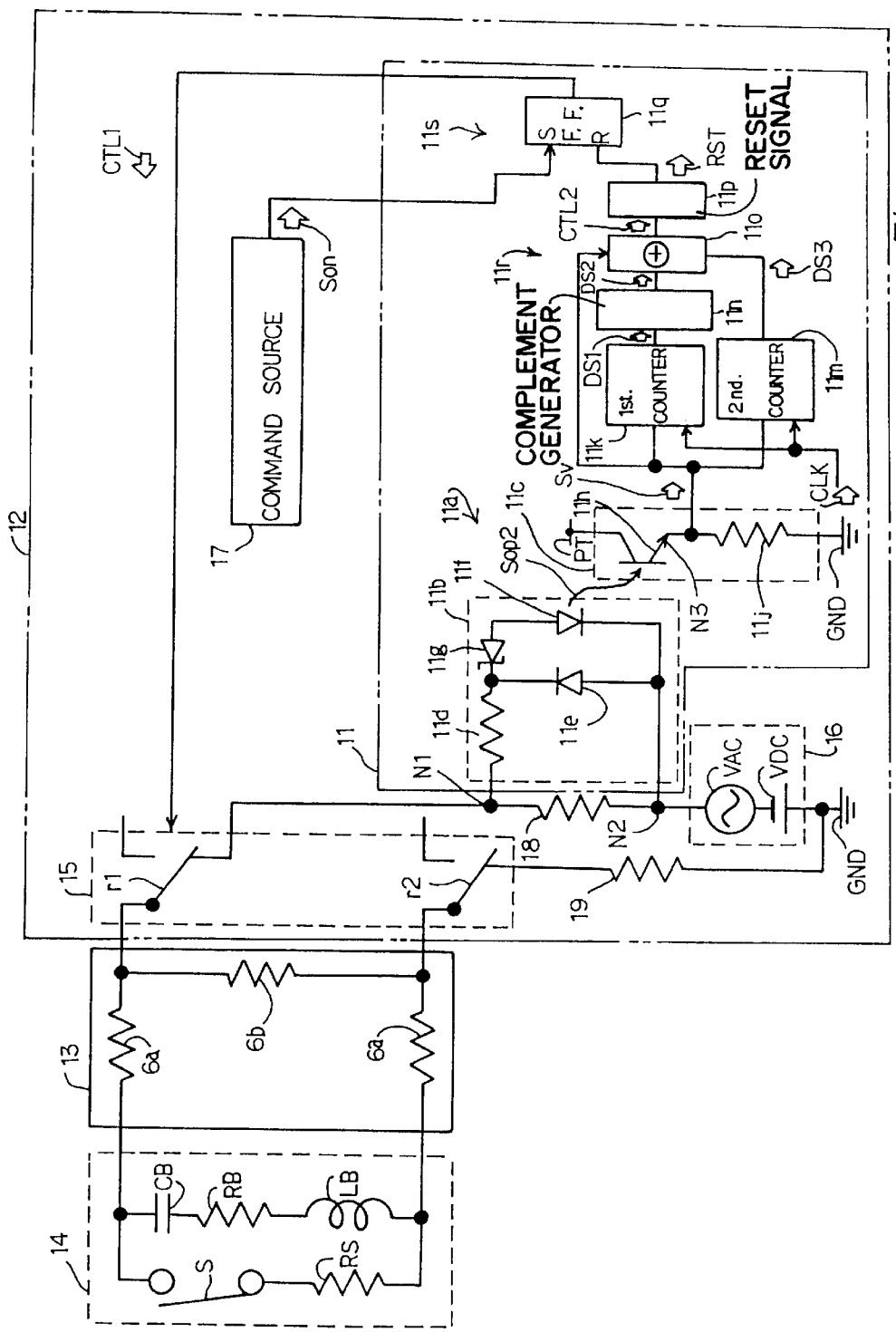
FIG. 3 is a circuit diagram showing a ring trip circuit incorporated in a telephone exchanger.

Referring to FIG. 3 of the drawings, a ring trip circuit embodying the present invention 11 is incorporated in a telephone exchanger 12. The telephone exchanger 12 is connected through telephone subscriber lines 13 to terminals 14 as similar to the prior art. Only one terminal 14 is illustrated in FIG. 3, and is connected through an associated telephone subscriber line 13 to the telephone exchanger 12. The terminal and the telephone subscriber line 13 are similar to those of the prior art, and component elements are labeled with references designating corresponding component elements of the prior art terminal/telephone subscriber line 14/13 without detailed description.

A relay unit 15, a call signal source 16 and a command source 17 are further incorporated in the telephone exchanger 12. The relay unit 15 has relay contacts r1/r2 which are connected through resistors 18/19 to the call signal source 16 and a ground line GND, respectively. The call signal source 16 is implemented by a series combination of an ac signal source VAC and a dc potential source VDC. The ac signal source VAC is connected to the resistor 18, and the dc potential source VDC is grounded. When the telephone exchanger 12 determines the terminal 14 to be called, the command source 17 supplies a relay-on signal Son to the ring trip circuit 11, and the ring trip circuit 11 changes a control signal CTL1 to high level. The control signal CTL1 of the high level causes the relay unit 15 to change the relay contacts r1/r2 so as to connect the call signal source 16 to the telephone subscriber line 13.

The ring trip circuit 11 includes a photo-coupling unit 11a. The photo-coupling unit 11a converts current IR18 passing through the resistor 18 to a potential signal Sv, and a photo-emitter 11b and a photo-detector 11c form in combination the photo-coupling unit 11a.

The photo-emitter 11b includes a resistor 11d, a photo-emitting diode 11f, a diode 11e and a Zener diode 11g. The resistor 11d is connected to one end of the resistor 18 so as to restrict the current flowing into the photo-emitter 11b, and the photo-emitting diode 11f has the cathode connected to the other end of the resistor N2. The Zener diode 11g has the anode connected to the anode of the photo-emitting diode 11f and the cathode connected to the cathode of the diode 11e. The anode of the diode 11e is connected to the other end N2, and the diode 11e prevents the photo-emitting diode 11f from damage. The resistor 18 converts the current IR18 to a potential difference, and the photo-emitting diode 11f controls the intensity of light depending upon the potential difference. For this reason, an optical signal Sop2 represents the amount of current IR18.

The photo-detector 11c includes a photo-detecting transistor 11h connected at the collector node thereof to a positive power supply line PT and a resistor 11j connected between the emitter node N3 of the photo-detecting transistor 11h and the ground line GND. The optical signal Sop is incident onto the photo-detecting transistor 11h, and the photo-detecting transistor 11h converts the optical signal Sop to the potential signal Sv. The potential signal Sv swings the potential level between the negative potential range and the positive potential range, and periodically crosses zero volt.

The ring trip circuit 11 further includes a first counter 11k, a second counter 11m, two's complement generator 11n, an adder 11o, a reset signal source 11p and a flip flop circuit 11q. The potential signal Sc and a clock signal CLK are supplied to the first counter 11k and the second counter 11m. The first counter is enabled with the potential signal Sv of a low potential range, and counts the pulses supplied thereto during the potential range. On the other hand, the second counter 11m is enabled with the potential signal Sv of a high potential range, and counts the pulses supplied thereto during the high potential range.

The first counter 11k supplies a first digital signal DS1 representative of a first binary number stored therein to the two's complement generator 11n. The two's complement generator 11n produces two's complement of the first binary number, and supplies a second digital signal DS2 representative of the two's complement to the adder 11o. The second counter 11m supplies a third digital signal DS3 representative of a second binary number stored therein to the adder 11o, and the adder 11o adds the two's complement of the first binary number to the second binary number. The potential signal Sv is supplied to the adder 11o, and the adder 11o calculates the sum at the decay from the high level to the low level.

The adder 11o produces a control signal CTL2 representative of the status of the terminal 14 on the basis of a fourth digital code DS4 representative of the sum, and supplies the control signal CTL2 to the reset signal source 11p. As will be described hereinlater in detail, when the terminal 14 is in the on-hook status, the carry bit of the fourth digital code DS4 is changed to zero. On the other hand, when the terminal 14 is in the off-hook status, the carry bit of the fourth digital code DS4 is changed to 1. The control signal CTL2 is representative of the value of the carry bit, and the reset signal source 11p determines whether to produce a reset signal RST or not. The reset signal RST is supplied to the flip flop circuit 11q, and the flip flop circuit 11q is responsive to the reset signal of active high level so as to change the control signal CTL1 to low level. The control signal of low level is supplied to the relay unit 15, and the relay unit 15 changes the relay contacts r1/r2 from the call signal source 16.

In this instance, the first and second counters 11k/11m, the two's complement generator 11n and the adder 11o as a whole constitute a status discriminator 11r, and the reset signal source 11p and the flip flop circuit 11q form in combination a relay controller 11s.

The ring trip circuit 11 behaves as follows. The resistors 18, 19 and 11d are assumed to have 1 kilo-ohm, 0.15 kilo-ohm and 10 kilo-ohms, respectively, and the dc potential source VDC and the ac signal source VAC respectively produce 48±10 volts and 60 to 120 Vrms at 14 to 33 Hz. The loop resistance 6a and the leak resistance 6b are assumed to be zero to 800 ohms and 15 kilo-ohms to infinity. In the terminal 14, the capacitor CB, the resistor RB and the coil LB are assumed to have 0.45 $\mu$F, 3.65 kilo-ohms and 54 H, respectively. The clamp voltage of the photo-emitting diode 11f is assumed to be 0.7 volt, and the Zener voltage of the Zener diode 11g is assumed to be 4.3 volts.

When the command source 17 supplies the relay-on signal Son to the flip flop circuit 11q, the flip flop circuit 11q changes the control signal CTL1 to the high level, and the relay unit 15 connects the call signal source 16 to the telephone subscriber line 13. The current IR18 flows through the resistor 18, and the potential difference DV1 takes place between the nodes N1 and N2.

When the potential difference DV1 exceeds the total of the Zener voltage and the clamp voltage, current flows through the resistor 11d, the Zener diode 11g and the photo-emitting diode 11f, and the photo-emitting diode 11f radiates the optical signal Sop2. In this instance, when the current IR18 exceeds 5 milli-ampere, the potential difference DV1 exceeds the total of the Zener voltage and the clamp voltage, i.e., 5 volts, and the photo-emitting diode 11f starts to radiate the optical signal Sop2. On the other hand, when the current IR18 is decreased to 5 milli-ampere, the photo-emitting diode 11f stops the optical signal Sop2. The photo-detecting transistor 11h is responsive to the optical signal Sop2 so as to produce the potential signal Sv. When the current IR18 is 5 milli-ampere, the potential signal Sv is changed from the high potential range to the low potential range and vice versa. When the dc current component of the call signal is 5 milli-ampere, the duty ratio of the potential signal becomes 50 percent.

Figure 4A:
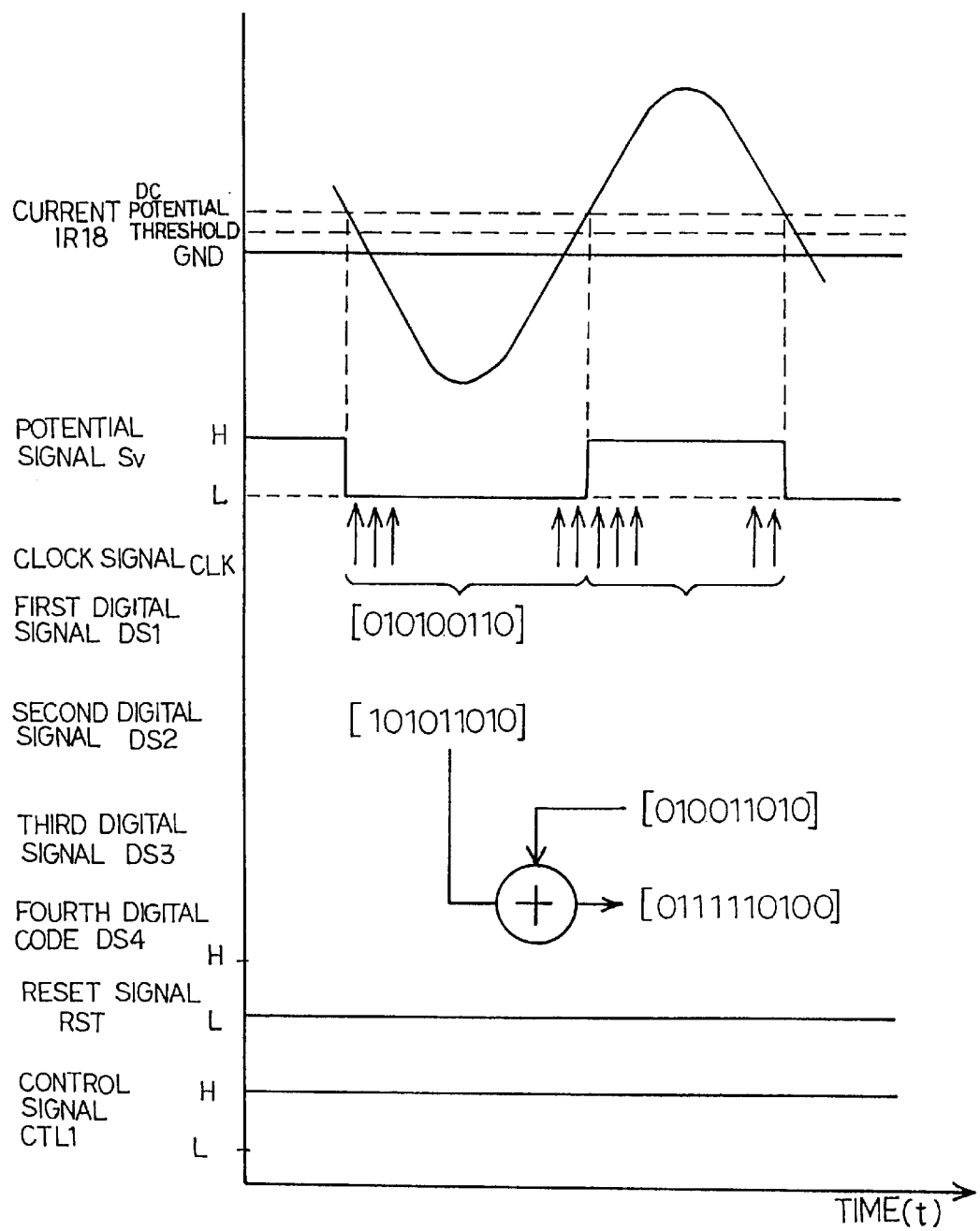
FIG. 4A is a view showing the waveforms of the essential signals produced in the ring trip circuit in the on-hook status.

When the terminal 14 is in the on-hook status, the capacitor CB interrupts a dc loop between the telephone exchanger 12 and the terminal 14. However, the leak resistance 6b of 15 kilo-ohms provides a current path for the dc current component. For this reason, the ac signal is superimposed on the dc current component of 3.6 milli-ampere, and the potential difference DV1 between the nodes N1 and N2 is 3.6 volts at the maximum. As a result, the duty ratio of the potential signal Sv is less than 50 percent as shown in FIG. 4A.

Figure 4B:
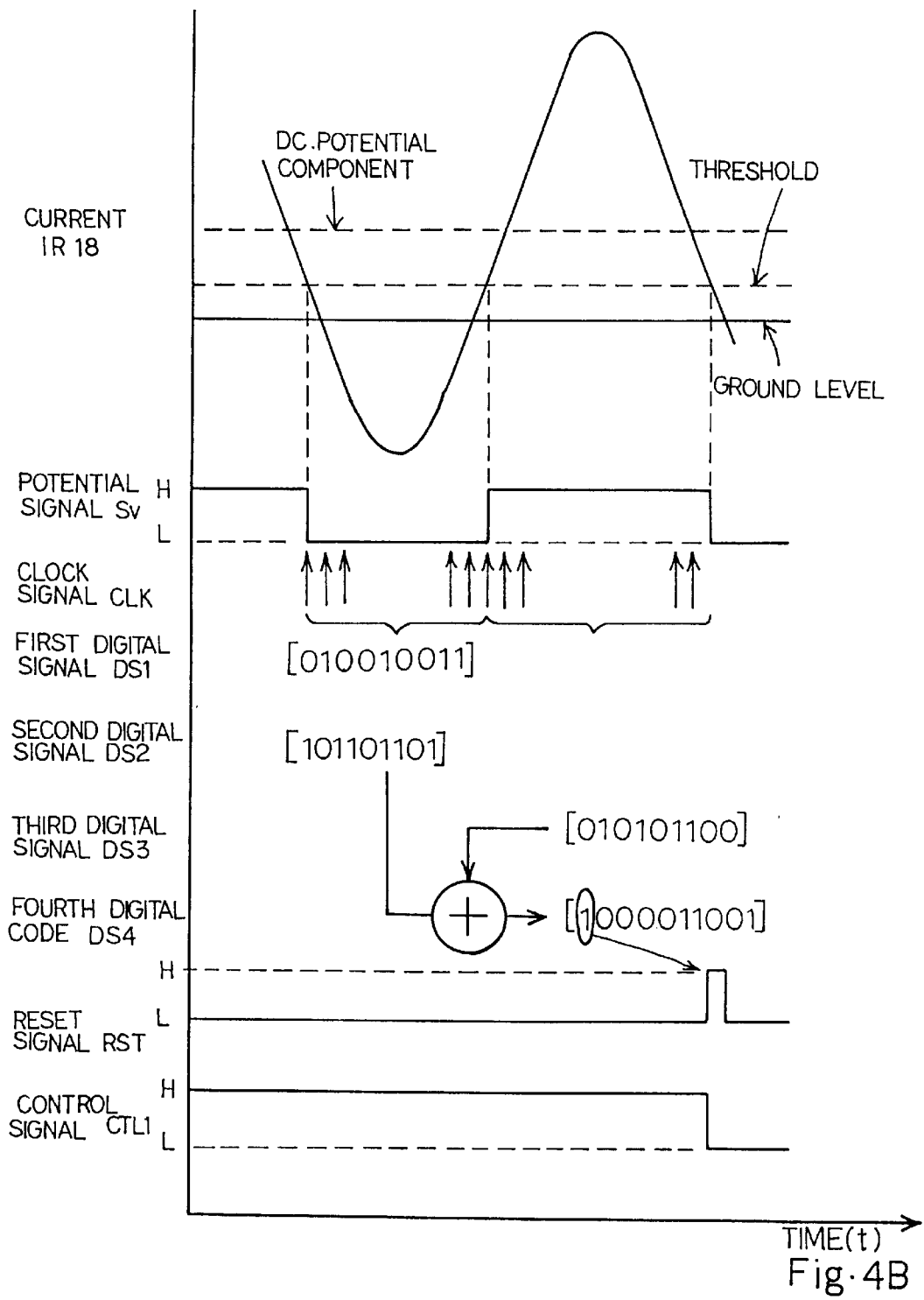
FIG. 4B is a view showing the waveforms of the essential signals produced in the ring trip circuit in the off-hook status.

On the other hand, when the terminal 14 is in the off-hook status, the switch unit S is closed, and the dc loop is established between the telephone exchanger 12 and the terminal 14. For this reason, the dc potential component is increased to 11.45 milli-ampere at the minimum, and the potential difference DV1 of 11.45 volts takes place between the nodes N1 and N2 at the minimum. As a result, the duty ratio of the potential signal Sv is greater than 50 percent as shown in FIG. 4B.

The first counter 11k maximizes the count value under the conditions where the dc potential component is minimum and the amplitude of the ac signal is maximum. The conditions are equivalent to the loop resistance S1 of 800 ohms, the leak resistance 6b of infinity, the dc potential VDC of 38 volts and the ac signal VAC of 120 Vrms at 25 Hz. The current IR18 is calculated by equation 9.

$$\text{IR18}=60.0\times\text{Sin }(50\pi t)+11.45[\text{mA}] \qquad \text{equation 9}$$

The potential signal Sv is in the low level for 18.38 millisecond, and is maintained in the high level for 21.62 millisecond. The duty ratio is 54.05 percent.

The first counter 11k is enabled with the potential signal of the low level so as to count the clock pulses CLK. The clock signal CLK is assumed to be 8 KHz.

As described hereinbefore, when the terminal 14 is in the on-hook status, the potential signal Sv remains in the low level for 20.75 millisecond, and the first counter 11k counts 166 pulses, i.e., 20.75/0.125. The first binary number is [9:1]=[010100110]. The number of pulses 166 is represented by nine bits, and the tenth bit is the carry bit. The two's complement generator 11n produces two's complement of the first binary number [101011010] as shown in FIG. 4A.

On the other hand, when the terminal 14 is in the off-hook status, the potential signal Sv remains in the low level for 18.38 millisecond, and the first counter 11k counts 147 pulses CLK, i.e., 18.38/0.125. The first binary number is [9:1]=[010010011], and the two's complement of the first binary number is [101101101] as shown in FIG. 4B.

The second counter 11m is enabled with the potential signal Sv of the high level so as to count the clock pulses CLK. When the terminal 14 is in the on-hook status, the second counter 11m counts 19.25/0.125=154 pulses, and the second binary number is [9:1]=[010011010] as shown in FIG. 4A. On the other hand, when the terminal 14 is in the off-hook status, the second counter 11m counts 21.62/0.125= 172 pulses, and the second binary number is [9:1]= [010101100].

The adder 11o calculates the sum of the two's complement of the first binary number and the second binary number so as to produce the fourth digital signal DS4. When the terminal 14 is in the on-hook status, the sum is represented as $$\text{SUM}=[101011010]+[010011010]=[0111110100] \qquad \text{equation 10}$$

On the other hand, when the terminal 14 is in the off-hook status, the sum is represented as $$\text{SUM}=[101101101]+[010101100]=[1000011001] \qquad \text{equation 11}$$

Thus, the carry bit "0" is representative of the on-hook status, and the carry bit "1" is representative of the off-hook status.

As described hereinbefore, when the potential signal Sv is changed from the high level to the low level, the adder 11o calculates the sum, and supplies the control signal CTL2 to the reset signal source 11p. If the control signal CTL2 is representative of the carry bit of "0", the reset signal source 11$p$ determines the terminal 14 to be in the on-hook status, and maintains the reset signal RST in the low level (see FIG. 4A). For this reason, the flip flop circuit 11$q$ keeps the control signal CTL1 high, and the call signal is continuously supplied through the relay unit 15 and the telephone subscriber line 13 to the terminal 14.

On the other hand, if the control signal CTL2 is representative of the carry bit of "1", the reset signal source 11$p$ determines the terminal 14 to be changed to the off-hook status, and the reset signal source 11$p$ changes the reset signal RST to the high level. As a result, the flip flop circuit 11$q$ changes the control signal CTL1 to the low level. Then, the relay unit 15 changes the relay contacts r1/r2 to the other side, and isolates the telephone subscriber line 13 from the call signal source 16.

As described hereinbefore, the adder 11$o$ calculates the sum at the decay of the potential signal Sv, and the reset signal source 11$p$ determines whether to produce the reset signal RST or not on the basis of the value of the carry bit. For this reason, the relay unit 15 changes the relay contacts r1/r2 around the decay of the potential signal Sv. When the current IR18 is decreased to a critical value represented as (Zener voltage of Zener diode 11$g$+clamp voltage of photo-emitting diode 11$f$)/resistance of the resistor 18. In the above described example, the critical value is 5 milli-ampere. As will be seen from FIGS. 4A and 4B, the critical value is close to the zero-crossing point, but is not equal to the zero-crossing point. Time delay is introduced between the decay of the potential signal Sv and the switching action of the relay unit 15. For this reason, the relay contacts r1/r2 are changed at a certain timing much closer to the zero-crossing point than the critical timing.

As will be appreciated from the foregoing description, the trip timing is not affected by fluctuation of the call signal source, the loop resistance and the leak resistance, and the ring trip circuit never produces the reset signal in the on-hook status. Moreover, the reset signal RST is produced before reaching the zero-crossing point, and the relay unit 15 changes the relay contacts r1/r2 as close to the zero-crossing point as possible. As a result, the associated circuits are prevented from the excess voltage.

Although a particular embodiment of the present invention has been shown and described, it will be obvious to those skilled in the art that various changes and modifications may be made without departing from the spirit and scope of the present invention.

What is claimed is:

1. A ring trip circuit associated with a call signal source electrically connected through a relay unit and a selected subscriber line to a user's terminal for supplying a call signal changed across zero level, comprising:

a photo-emitting unit connected to a signal line assigned to said call signal, and producing an optical signal representative of the magnitude of said call signal;

a photo-detecting unit optically connected to said photo-emitting unit, and producing a first electric signal changed from a first potential level to a second potential level and vice versa when said call signal is decreased to a certain magnitude close to said zero level;

a status discriminator connected to said photo-detecting unit discriminating status of said user's terminal at the change of said first electric signal changed from said first potential level to said second potential level, and producing a second electric signal representative of said status of said user's terminal, in which said status discriminator includes, a first counter counting enabled with said first electric signal of said second potential level for counting pulses supplied thereto and producing a first digital signal representative of the number of said pulses stored therein, a two's complement Generator connected to said first counter for producing a second digital signal representative of two's complement of the binary number of said first digital signal, a second counter enabled with said first electric signal of said first potential level for counting said pulses and producing a third digital signal representative of the number of said pulses stored therein, and an adder calculating the sum of said two's complement and the binary number of said third digital signal at said change of said first electric signal and producing a fourth electric signal representative of a carry bit of said sum, a value of said carry bit being indicative of said status of said user's terminal; and a relay controller connected to said status discriminator and a command source for controlling said relay unit, and supplying a third electric signal to said relay unit depending upon said status for changing said relay unit.

2. The ring trip circuit as set forth in claim 1, in which a first resistor is inserted into said signal line, and said photo-emitting unit produces said optical signal representative of a potential difference across said first resistor.

3. The ring trip circuit as set forth in claim 2, in which said photo-emitting unit includes a second resistor having one end connected to one end of said first resistor, a Zener diode having a cathode connected to the other end of said second resistor, a photo-emitting element having a current input node connected to an anode of said Zener diode and a current output node connected to the other end of said first resistor, and a protective diode having a cathode connected to said other end of said second resistor and an anode connected to said other end of said first resistor.

4. The ring trip circuit as set forth in claim 3, in which said photo-emitting element is a photo-emitting diode.

5. The ring trip circuit as set forth in claim 1, in which said photo-detecting unit includes a photo-detecting element supplied with said optical signal and having a current input node connected to a first constant potential source, and a current-to-voltage converter connected between a current output node of said photo-detecting element and a second constant potential source different in potential level from said first constant potential source.

6. The ring trip circuit as set forth in claim 5, in which said photo-detecting element is a photo-detecting transistor.

7. The ring trip circuit as set forth in claim 6, in which said photo-emitting unit includes a second resistor having one end connected to one end of said first resistor, a Zener diode having a cathode connected to the other end of said second resistor, a photo-emitting element having a current input node connected to an anode of said Zener diode and a current output node connected to the other end of said first resistor and a protective diode having a cathode connected to said other end of said second resistor and an anode connected to said other end of said first resistor, and said photo-detecting unit includes a photo-detecting element supplied with said optical signal and having a current input node connected to a first constant potential source and a current-to-voltage converter connected between a current output node of said photo-detecting element and a second constant potential source different in potential level from said first constant potential source.

8. The ring trip circuit as set forth in claim 7, in which said photo-emitting element and said photo-detecting element are a photo-emitting diode and a photo-detecting transistor.

9. The ring trip circuit as set forth in claim 4, in which said magnitude of said call signal is expressed as (Vz+Vc)/R where Vz is the Zener voltage of said Zener diode, Vc is a clamp voltage of said photo-emitting diode and R is the resistance of said first resistor.

10. A ring trip circuit associated with a call signal source electrically connected through a relay unit and a selected subscriber line to a user's terminal for supplying a call signal changed across zero level, comprising:

a photo-emitting unit connected to a signal line assigned to said call signal, and producing an optical signal representative of the magnitude of said call signal;

a photo-detecting unit optically connected to said photo-emitting unit, and producing a first electric signal changed from a first potential level to a second potential level and vice versa when said call signal is decreased to a certain magnitude close to said zero level;

a status discriminator connected to said photo-detecting unit discriminating status of said user's terminal at the change of said first electric signal changed from said first potential level to said second potential level, and producing a second electric signal representative of said status of said user's terminal, in which said status discriminator includes a first counter counting enabled with said first electric signal of said second potential level for counting pulses supplied thereto and producing a first digital signal representative of the number of said pulses stored therein, a two's complement generator connected to said first counter for producing a second digital signal representative of two's complement of the binary number of said first digital signal, a second counter enabled with said first electric signal of said first potential level for counting said pulses and producing a third digital signal representative of the number of said pulses stored therein, and an adder calculating the sum of said two's complement and the binary number of said third digital signal at said change of said first electric signal and producing a fourth electric signal representative of a carry bit of said sum, a value of said carry bit being indicative of said status of said user's terminal; and a relay controller connected to said status discriminator and a command source for controlling said relay unit, and supplying a third electric signal to said relay unit depending upon said status for changing said relay unit, and said relay controller includes a reset signal source responsive to said fourth electric signal for changing a reset signal between an active level and an inactive level and a flip flop circuit responsive to a fifth electric signal supplied from said command source and said reset signal for changing said second electric signal.

11. The ring trip circuit as set forth in claim 10, in which a first resistor is inserted into said signal line, and said photo-emitting unit produces said optical signal representative of a potential difference across said first resistor.

12. The ring trip circuit as set forth in claim 11, in which said photo-emitting unit includes a second resistor having one end connected to one end of said first resistor, a Zener diode having a cathode connected to the other end of said second resistor, a photo-emitting element having a current input node connected to an anode of said Zener diode and a current output node connected to the other end of said first resistor, and a protective diode having a cathode connected to said other end of said second resistor and an anode connected to said other end of said first resistor.

13. The ring trip circuit as set forth in claim 12, in which said photo-emitting element is a photo-emitting diode.

14. The ring trip circuit as set forth in claim 13, in which said magnitude of said call signal is expressed as (Vz+Vc)/R where Vz is the Zener voltage of said Zener diode, Vc is a clamp voltage of said photo-emitting diode and R is the resistance of said first resistor.

15. The ring trip circuit as set forth in claim 10, in which said photo-detecting unit includes a photo-detecting element supplied with said optical signal and having a current input node connected to a first constant potential source, and a current-to-voltage converter connected between a current output node of said photo-detecting element and a second constant potential source different in potential level from said first constant potential source.

16. The ring trip circuit as set forth in claim 15, in which said photo-detecting element is a photo-detecting transistor.

17. The ring trip circuit as set forth in claim 16, in which said photo-emitting unit includes a second resistor having one end connected to one end of said first resistor, a Zener diode having a cathode connected to the other end of said second resistor, a photo-emitting element having a current input node connected to an anode of said Zener diode and a current output node connected to the other end of said first resistor and a protective diode having a cathode connected to said other end of said second resistor and an anode connected to said other end of said first resistor, and said photo-detecting unit includes a photo-detecting element supplied with said optical signal and having a current input node connected to a first constant potential source and a current-to-voltage converter connected between a current output node of said photo-detecting element and a second constant potential source different in potential level from said first constant potential source.

18. The ring trip circuit as set forth in claim 17, in which said photo-emitting element and said photo-detecting element are a photo-emitting diode and a photo-detecting transistor.

* * * * *

UNITED STATES PATENT AND TRADEMARK OFFICE
CERTIFICATE OF CORRECTION

PATENT NO.    : 6,185,296 B1                                        Page 1 of 1
DATED         : February 6, 2001
INVENTOR(S)   : Masashi Saitoh It is certified that error appears in the above-identified patent and that said Letters Patent is hereby corrected as shown below:

Column 3,
Line 48, "13 falls the output" should read -- output signal 13 falls --

Column 10, claim 1,
Line 6, "Generator" should read -- generator --

Signed and Sealed this

Twelfth Day of March, 2002

Attest:

JAMES E. ROGAN
*Attesting Officer*              *Director of the United States Patent and Trademark Office*